Feb. 19, 1924.
F. HALLER
ANTISKID DEVICE
Filed June 11, 1923
1,484,392
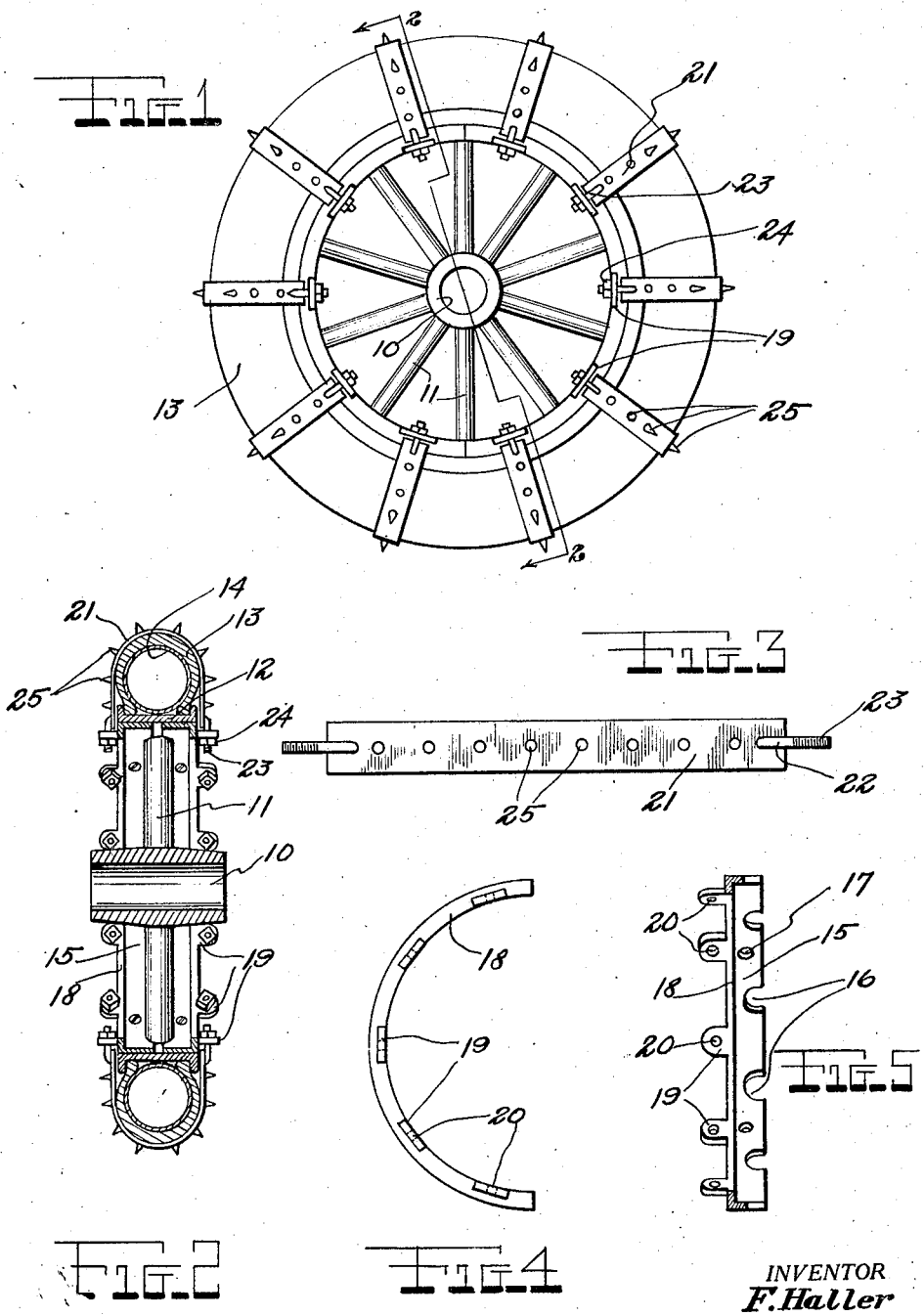
INVENTOR
*F. Haller*
BY
*Marvin Lahring*
ATTORNEY Patented Feb. 19, 1924.

1,484,392

UNITED STATES PATENT OFFICE.

FRITZ HALLER, OF BERNARDSVILLE, NEW JERSEY.

ANTISKID DEVICE.

Application filed June 11, 1923. Serial No. 644,576.

*To all whom it may concern:*

Be it known that I, FRITZ HALLER, a citizen of Switzerland, residing at Bernardsville, in the county of Somerset and State of New Jersey, have invented certain new and useful Improvements in Antiskid Devices, of which the following is a specification.

This invention relates to improvements in devices for preventing skidding of vehicle tires and has as its main object to provide an effective device which may be easily applied or removed without interference with the wheel.

Another purpose is to produce an antiskid device of exceptional simplicity and strength and so constructed as to be applicable to existing types of spoked wheels, entailing no change in their structure.

These several aims, objects and purposes are attained by the novel construction and arrangement of parts hereafter described and shown in the accompanying drawing, forming part of this disclosure, and in which:—

Figure 1 is a side view of a conventional type of vehicle wheel showing an application of an embodiment of the invention.

Figure 2 is a transverse sectional view taken on line 2—2 of Figure 1.

Figure 3 is a plan view of one of the spur carrying elements extended at length.

Figure 4 is a fragmentary side view of the clamp element.

Figure 5 is a sectional view of the same.

Referring more in detail to the drawing, the numeral 10 designates the hub of the wheel from which radiate spokes 11 engaging the channel shaped rim 12 carrying the tire 13 enclosing the inflatable tube 14.

The invention consists in providing for each wheel a band 15, each band comprising two semi-circular elements having notches 16 suited to engage the several spokes 11 and screw holes 17 to receive fastening means by which the band is held firmly in place adjacent the inner portion of the rim 12.

Formed with the band elements, on their outer edges, are in-reaching flanges 18 from which extend angularly outward a plurality of spaced lugs 19 containing bolt holes 20.

An equivalent number of relatively thin flat metallic strips are provided with rod ends 22 screw-threaded at their outer portions, as at 23, said ends being suited to pass through the holes 20 and receive nuts 24 by which the strips 21 are firmly bound over the tread surface of the wheel in the manner indicated.

Rigidly fixed to stand outward from the face of the strips are a plurality of spurs 25 adapted to engage with the surface over which the wheel is caused to travel, the spurs entering into the surface to such an extent as to avoid any possibility of slipping or skidding in any direction and increasing correspondingly the tractive effect of the wheel.

Obviously the rings may remain at all times in position on the wheel, while the strips, together with the spurs, may be removed by releasing the nuts at any time the devices are not required.

From the foregoing it will be seen that a simple and practical device has been disclosed in the preferred form of its embodiment.

Having thus described my invention and set forth the manner of its application and use, what I claim as new and desire to secure by Letters Patent, is:—

1. A non-skid device comprising a pair of rings secured to a vehicle wheel, perforate lugs extending outward from said rings, a plurality of spur carrying strips having their ends engaged with said lugs, and means for stressing said strips over the tread surface of the wheel.

2. A non-skid device comprising a pair of rings secured to a vehicle wheel, said rings being notched to engage the wheel spokes, inreaching flanges formed with said rings, lugs extending oppositely outward from said flanges, said lugs being perforate, strips having bolt ends enterable through the perforations in said lugs, means for stressing said strips, and a plurality of spurs carried by said strips.

3. A non-skid device comprising a pair of rings secured to a vehicle wheel, said rings being notched to engage each spoke in the wheel, means for fastening said rings to the inner surface of the wheel rim, pairs of lugs extending oppositely outward from said rings, spur carrying strips having bolt ends engageable within said lugs, and nuts on said bolt ends by which said strips may be held in close intimate relation to the wheel tire.

In witness whereof I have affixed my signature.

FRITZ HALLER.